April 20, 1954 C. M. PERKINS, SR., ET AL 2,676,291
HARMONIC DISCRIMINATING CATHODE FOLLOWER CIRCUIT IN A SERVO SYSTEM
Filed July 2, 1948
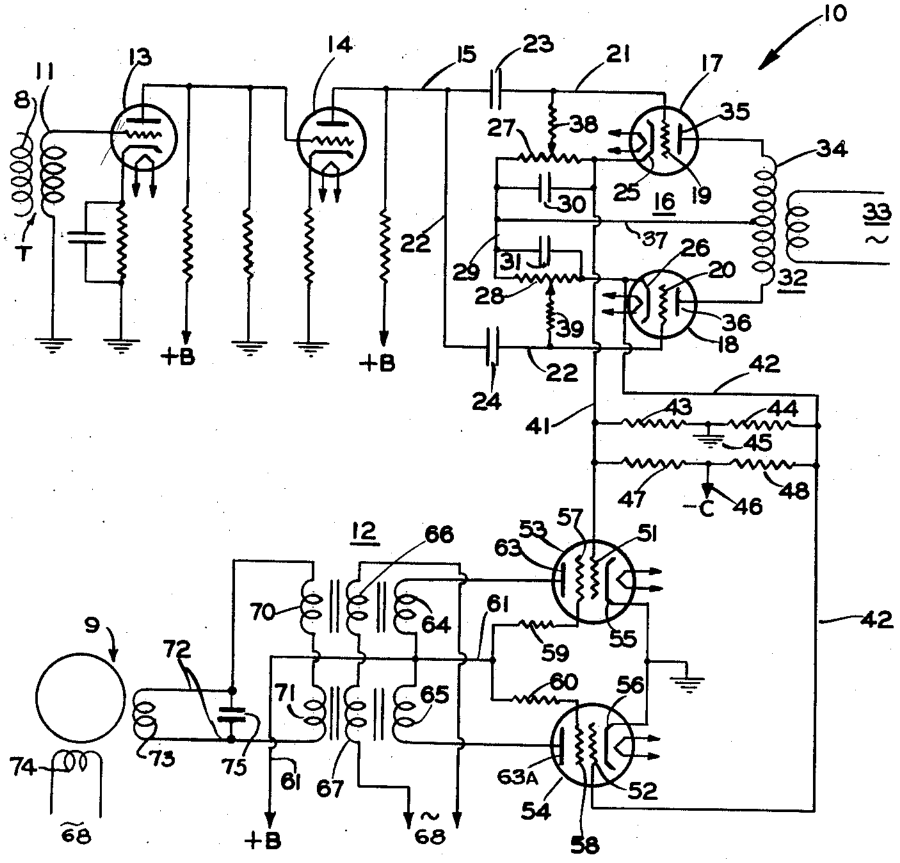
INVENTORS
CORLES M. PERKINS, SR.
ALAN M. MAC CALLUM
BY [signature]
- ATTORNEY -

Patented Apr. 20, 1954

2,676,291

UNITED STATES PATENT OFFICE 2,676,291

HARMONIC DISCRIMINATING CATHODE FOLLOWER CIRCUIT IN A SERVO SYSTEM

Corles M. Perkins, Sr., Rutherford, and Alan M. MacCallum, Plainfield, N. J., assignors to Bendix Aviation Corporation, Teterboro, N. J., a corporation of Delaware Application July 2, 1948, Serial No. 36,736

5 Claims. (Cl. 318—207)

This invention relates to electronic amplifiers, and more particularly to an amplifier for a servomotor system in which the servomotor is operated in accordance with signals initiated at a remote point.

In servo systems wherein an object is positioned in accordance with a signal transmitted from a remote point as by a synchronous transmitter, an amplifier is incorporated in such a system for increasing the power of the initial error signal. Such an amplifier, in response to an error signal will then drive the servomotor to a null position corresponding to the signal voltages developed by the transmitter.

To recognize direction of input error signal, a circuit in the amplifier known as a discriminator has been used. This consists of two vacuum tubes whose control grids are tied together and whose plates are supplied from a center tapped transformer whose center tap is returned to the cathodes of the tubes. In series with the transformer windings and the plates are impedances, which are the control coils of a magnetic amplifier.

The voltages on the plates of the two tubes, referred to the cathodes of the tubes, are 180 degrees out-of-phase, or of opposite polarity. The tubes are so biased that in the absence of signal, no plate current will flow. The phase of the voltages applied to the plates are arranged to be either of the same or opposite polarity with reference to the signal input. Since the polarity of the input to the grids is changing with the direction of error, the plate having the same polarity as the input signal changes with direction of input error, the phase of the plates being fixed. This is used to determine, or discriminate, the direction of the input error.

The input to the grids of the discriminator tubes has been assumed to be a sine wave of the same frequency as the plate voltage, and in phase or out of phase with the plate voltage. However, the voltage output of any signal generator containing magnetic circuits, contains certain portions of odd harmonics, particularly the third. This is produced by the non-linear relation between flux and magnetomotive force, and may be minimized but never entirely eliminated.

Since a large signal is to be produced from a small signal generator the amount of harmonics present may be appreciable. While the fundamental frequency signals are arranged to cancel for the zero error condition, the harmonics rarely cancel, and the condition of a very low fundamental signal component may be accompanied by the presence of a relatively high voltage corresponding to the odd harmonics. The effect these conditions have upon the discriminators in the usual system is characterized by plate current flowing in both discriminator tubes on successive half cycles.

A greater current will flow in the tube whose plate voltage is more nearly in phase with the signal voltage, thus preserving the sense of the output for substantial phase angle variations from the ideal. However, any out-of-phase condition must be accompanied by two effects, a loss in sensitivity and production of heat in the magnetic amplifiers connected into the output of the discriminator to operate the servomotor. Since current flows in both control coils, both cores are saturated, and impedances of all windings drop. If equal currents flow in both control coils, the impedances move together and there is still no output from the magnetic amplifiers. With the lower impedances more primary current flows, and large quantities of heat are produced by the $I^2R$ loss in the windings. These losses may be high enough to seriously reduce the life of the magnetic amplifiers. If the currents are unequal there is an output from the system, but this is reduced from that normally found since the voltage drops are not as unequal as before due to the saturation of both cores, although one more than the other. This is felt as a loss in sensitivity.

The presence of harmonics or out-of-phase voltages, therefore, causes a flow of current in both sides of a discriminator circuit. The fundamental in-phase signal causes flow in only one tube however. If the difference in plate currents of the discriminator can be determined and this difference applied either directly or indirectly to the magnetic amplifier control coils, the difference seen by the control coils must represent only the fundamental in phase voltage and will be characterized by current flow in only one control coil.

An object of our invention therefore is to provide an electronic amplifier having a discriminator section in which the harmonic and out-of-phase components of the signal voltages are effectively eliminated, the amplifier output being responsive to the fundamental frequency of the input signal voltage.

Other objects of the invention will in part be obvious and in part hereinafter pointed out.

Referring now in detail to the circuit diagram of the accompanying figure forming a part of this specification in which one of the various possible embodiments of our invention is illustrated, the numeral 10 designates an electronic circuit interconnecting a source of A. C. signal input 11 and a magnetic amplifier 12, the output of which is responsive to the phase and amplitude of the A. C. signal input and controls operation of a two-phase reversible motor 9.

The signal is impressed on a transformer T having a primary 8 and a grounded secondary 11 connected to a two stage resistance coupled preamplifier comprising the two triodes 13 and 14. The output of the preamplifier is impressed by a lead 15 on a discriminator circuit 16 comprising the two triode tubes 17 and 18. The grids 19 and 20 of the respective tubes are connected by leads 21 and 22 through coupling condensers 23, 24 to the lead 15. The indirectly heated cathodes 25, 26 are connected through bias resistors 27, 28 and by-pass condensers 30 and 31 in parallel therewith to a common lead 29. A transformer 32 connected across a suitable A. C. potential supply 33 supplies the plate voltage. The center-tapped secondary winding 34 of the transformer is connected at one end to the plate 35 of tube 17 while the other end is connected to the plate 36 of the tube 18. The plate return is by a lead 37 interconnecting the center tap of the secondary winding 34 and the cathode lead 29. Grid resistors 38 and 39 interconnecting the grids and cathodes of the respective tubes complete the discriminator circuit 16.

For purposes hereinafter appearing, the cathodes 25 and 26 are connected by the leads 41 and 42 through resistors 43, 44 respectively, to ground 45 to form a voltage divider as will hereinafter be apparent. The leads 41 and 42 are further connected to a source of −C supply 46 through resistors 47 and 48 and to the control grids 51 and 52 of two parallel connected tetrodes 53 and 54. The indirectly heated cathodes 55, 56 are grounded, while the screen grids 57, 58 are connected through suitable resistors 59, 60 to a +B lead 61. The plates 63 and 63A of the respective tetrodes are connected through the saturating windings 64, 65 of the magnetic amplifier 12 to the +B supply lead 61. The saturating windings 64, 65 are wound about a soft iron core (not shown), together with the primary windings 66, 67 series connected across a source of A. C. potential 68, and the secondary windings 70, 71 connected in series opposed relation across the output leads 72. One field winding 73 of motor 9 is connected across output leads 72 and the other winding 74 of motor 9 is separately excited by A. C. source 68. A condenser 75 is connected across field winding 73. The freqenucy of source 68 may be the same as or different from the frequency of source 33.

The discriminator circuit 16 described will be recognized as comprising two cathode follower amplifiers whose plates 35, 36 are supplied directly from the center tapped transformer 32 and whose grids 19, 20 are tied together and supplied with the output from the preamplifier. The plate voltage to the cathode followers is so arranged that it is in-phase or 180 degrees out-of-phase with the output from the preamplifier depending upon the polarity of the input thereto and which cathode follower is being considered. Plate current will flow in accordance with the input signal. It will be noted that the center tap of the transformer 32, used to supply the plates 35, 36 of the discriminator, is connected to resistors 27, 28 of the cathode follower, and is isolated from ground 45 by the resistors 43, 27 and 44, 28. This isolates the center tap of the transformer from cathodes 55, 56 of tubes 53, 54 so that the difference in cathode voltages of tubes 17, 18 corresponds to the phase and amplitude of the input signal.

Plate current may flow in the discriminator for zero signal input, and since this is normally more efficient from the standpoint of voltage amplification than is zero current flow, it will be assumed that small plate currents do flow at the null position of the signal transmitter. Any current flowing in the discriminator tubes 17, 18 will cause a difference in potential along the cathode resistors 27, 28, with the end returned to the transformer center tap negative with respect to the end connected to the cathode of the tube. At null, with plate current flowing, both cathodes 25, 26 will be positive with respect to the center tap of the transformer, and equal, since the voltages and the circuit components for the two sections are identical. While there is, therefore, a potential difference between each cathode and the center tap of the transformer, there is no potential difference between the two cathodes. With no potential difference between the cathodes, the potential of leads 41 and 42 will be equal. It is to be noted that the cathode resistors 27 and 28 are shunted by capacitances 30 and 31, respectively. In the absence of these capicitances the potentials of the cathode would be alternating due to the alternating plate voltages. The condensers 30, 31 provide for the storage of energy, the potential of the cathodes being held very nearly constant (D. C.).

If a signal is introduced on the grids 19, 20 of the discriminator 16, more current will flow in the tube for which the grid signal and plate voltage are of the same phase. The potential of the cathode from which the higher current is flowing will now be higher than that of the other cathode, which will now be delivering less current than before. Consequently there will be a potential difference between the cathodes, and hence between leads 41 and 42. If we assume that the signal is such as to cause more current to flow through tube 17 than 18, the potential of the cathode 25 will then be higher than that of cathode 26. Electron current will flow from cathode 26 through resistors 44 and 43 to cathode 25. Since the midpoint of resistors 43, 44 is grounded at 45, the potential of lead 41 referred to ground will then be positive, while the potential of lead 42 with respect to ground will then be negative. If the signal is such that plate current flows in tube 18 rather than 17, the opposite condition will obtain; lead 42 being positive with respect to ground while lead 41 is negative with respect to ground.

The isolation of the center tap of the transformer 32 used to supply the discriminator plates 35, 36 permits a voltage dividing network to be inserted between the two cathodes 25, 26, the center of which is grounded. Two voltages to each cathode measured from ground are thus obtained. These voltages are dependent only upon difference in potential between the two cathodes 25, 26 and are zero for zero difference in potential. For a difference in potential between the cathodes one potential becomes negative with respect to ground and the other becomes positive.

The changes in potential of leads 41 and 42 are used to control the current output of the tubes 53 and 54. The saturating coils 64, 65 of the magnetic amplifier are in the plate circuits of the tubes, and the plates 63, 63A are supplied through the windings with plus D. C. voltage. Since plate current will flow with D. C. on the plates and zero grid voltage, it is necessary to provide negative bias to cut-off the tubes. This negative bias is applied by the —C supply 46 at the midpoint of resistors 47 and 48. The leads 41 and 42 are then negative with respect to ground. Since the center tap of the discriminator transformer is not returned directly to ground, this has no effect on the discriminator operation, and will reduce the plate current of the tubes 53, 54 to zero for no signal input to the discriminator. A signal into the discriminator 16 causing a higher plate current in one tube than the other, will make one grid of the tubes 53, 54 positive with respect to the other. The discriminator plate current will reduce the negative voltages applied to the tube (53 or 54) whose grid is moving positive, and increase the negative voltage on the grid that is moving negative. Plate current will flow in the tube whose grid goes positive, while no current will flow in the other tube. Since no condition can make both of the leads 41, 42 positive with respect to ground, due to the isolation of the transformer supplying the discriminator, no plate current will flow in either of the tubes 53 or 54. Applying out-of-phase signals and harmonics to the discriminator 16 will cause flow of plate current in both tubes 17 and 18 to increase, but since the difference in potential between the cathodes of the discriminator is measured, only the useful component capable of causing a higher plate current in one side of the discriminator than the other will be applied to the output tubes 53, 54.

As various embodiments may be made of the above invention, and as various changes may be made in the embodiment set forth, it will be understood that all matter herein contained, or shown in the accompanying drawings, is to be interpreted as illustrative and not in a limiting sense.

Having thus described our invention, we claim as new and desire to secure by Letters Patent:

1. An amplifier for operating a motor in response to signal voltages which have a phase component reversible with respect to a predetermined phase and undesirable components of other phase relationships, comprising balanced inductive means for developing an output for said motor when unbalanced, driver means for unbalancing said inductive means, and means for eliminating said undesirable components, said last-named means including two cathode followers, each having a control grid connected to receive said signals, a cathode, and an anode, a center-tapped transformer having its ends connected to said anodes and its center-tap connected to said cathodes so that the center-tap is isolated from ground, whereby only said reversible phase component develops a difference in voltage between the cathode circuits of said cathode follower, said driver means including two electron discharge devices having negatively biased control grids, means for applying the voltage difference of the cathode circuits to the control grids of said driver means to operate one of said discharge devices selectively in accordance with the reversible phase component of said signal voltage, and means for connecting the output of said driver means to said inductive means so as to unbalance the latter by the operation of said driver means for operating the motor in response to said signals.

2. An amplifier for operating a motor in response to signal voltages which have a phase component reversible with respect to a predetermined voltage phase and undesirable components of other phase relationships, comprising balanced inductive means for developing an output for said motor when unbalanced, driver means for unbalancing said inductive means, and means for eliminating said undesirable components, said last-named means including two electron discharge devices, each having a control grid connected to receive said signals, an anode and a cathode, a center-tapped transformer having its ends connected to said anodes, and its center-tap connected by resistors to said cathodes so that the center-tap is isolated from ground, means for energizing said transformer by a voltage in phase with said predetermined phase, whereby only said reversible phase component develops a difference in voltage across said cathodes, said driver means including two electron discharge devices having negatively biased control grids, means for applying said difference in the voltage across said cathodes to the control grids of said driver means to operate one of said driver means selectively in accordance with the reversible phase component of said signal, said balanced inductive means being connected to the output of said driver means so as to be unbalanced by the operation of the latter for operating the motor in response to the signal.

3. A servoamplifier for operating a servomotor in response to signal voltages which have a phase component reversible with respect to a predetermined voltage phase and undesirable components of other phase relationships, comprising a balanced inductive device for developing an output for said servomotor when unbalanced, driver means for unbalancing said inductive device, and a means for eliminating said undesirable components, said last-named means including two electron discharge devices, each having a control grid connected to receive said signals, a cathode, and an anode, a center-tapped transformer adapted to be energized by an A. C. source of the same frequency as the signal voltages and having its ends connected to said anodes and its center-tap connected by resistors to said cathodes so that its center-tap is isolated from ground, whereby only the reversible phase component develops a voltage difference across said cathodes, said driver means including two electron discharge devices having their grids biased to cut-off and means for applying said voltage difference across said cathodes to the control grids of said driver means whereby a selected one of said driver means develops an output in accordance with said voltage difference, said balanced inductive device being connected to the outputs of said driver means and adapted to be unbalanced by the operation of the latter for operating the servomotor in response to the signal voltage.

4. An amplifier for operating a motor in response to signal input voltages which have a phase component reversible with respect to a predetermined voltage phase and undesirable components of other phase relationships, comprising balanced inductive means for developing an output for said motor when unbalanced, driver means for unbalancing said inductive means, and means for eliminating said undesirable components, said last-named means including two electron discharge devices, each having a control grid connected to receive said signals, a cathode, and an anode, a center-tapped transformer adapted to be energized by an A. C. source of the same frequency as the signal voltages and having its ends connected to said anodes, resistors connecting said cathodes to the center-tap of the transformer, a voltage divider interconnecting said cathodes and having its midpoint grounded, whereby said center-tap is isolated from ground by said divider and said resistors in the cathode circuits of said electron devices so that the voltage across said divider is indicative of the difference in the anode currents of said electron discharge means, said driver means including two electron discharge devices having control grids biased to cut-off, means for applying said voltage across said divider to the control grids of said driver means to operate selectively one of said driver means in accordance with the reversible phase component of said signal input voltage, said balanced inductive means being connected to the output of said driver means so as to be unbalanced by the operation of the latter for operating the motor in response to said signal voltage.

5. An amplifier for operating a motor in response to signal input voltages having components of a phase reversible with respect to a predetermined voltage phase and undesirable components of other phase relationships, comprising balanced inductive means for developing an output for said motor when unbalanced, driver means for unbalancing said inductive means, a preamplifier for receiving said signal, and means for eliminating said undesirable components, said last-named means including two electron discharge devices, each having a control grid, a cathode, and an anode, said preamplifier having its output connected to said control grids, a center-tapped transformer energized by an alternating current source having the same frequency as the signal voltage and having its ends connected to said anodes, resistors connecting said cathodes to the center-tap of said transformer, a pair of series connected resistors interconnecting the cathodes of said tubes and having a midpoint grounded so that said center-tap is isolated from ground by said pair of resistors and the resistors in the respective cathode circuits of said electron discharge devices, whereby the voltage difference across said pair of series connected resistors is indicative of the difference in anode currents between said electron discharge devices, said driver means including two electron discharge devices having control grids biased to cut-off, means for applying the voltage across said pair of series connected resistors to the control grids of said driver means to operate selectively one of said driver means in accordance with the reversible phase component of said signal input voltage, said balanced inductive means being connected to the output of said driver means so as to be unbalanced by the operation of the latter for operating the motor in response to said signal input voltage.

References Cited in the file of this patent

UNITED STATES PATENTS

| Number | Name | Date |
|---|---|---|
| 1,936,414 | Stone | Nov. 21, 1933 |
| 2,396,187 | Means et al. | Mar. 5, 1946 |
| 2,409,970 | Agins | Oct. 22, 1946 |
| 2,423,438 | Dawson | July 8, 1947 |
| 2,432,422 | Hornfeck | Dec. 9, 1947 |
| 2,434,822 | Van Beuren | Jan. 20, 1948 |
| 2,450,084 | Emerson | Sept. 28, 1948 |
| 2,485,005 | Lindesmith | Oct. 18, 1949 |
| 2,517,556 | Goertz | Aug. 8, 1950 |
| 2,528,054 | Harrison | Oct. 31, 1950 |